PHONOGRAPH PREAMPLIFIER WITH DIRECT DC BIAS COUPLING BETWEEN THE TRANSISTOR AND PIEZORESISTIVE PICKUP
Filed Feb. 8, 1967
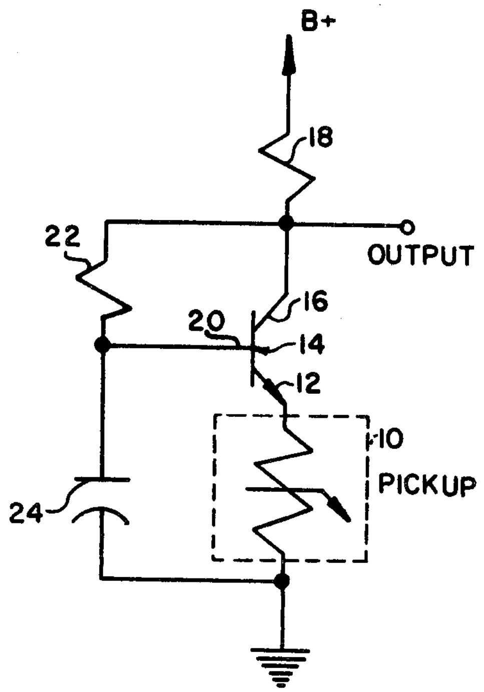
INVENTOR
JOHN STEPHEN GROUT
Thomas A. Briody
ATTORNEY

United States Patent Office 3,534,180
Patented Oct. 13, 1970

3,534,180

PHONOGRAPH PREAMPLIFIER WITH DIRECT DC BIAS COUPLING BETWEEN THE TRANSISTOR AND PIEZORESISTIVE PICKUP

John Stephen Grout, Decatur, Ill., assignor to General Electric Company, a corporation of New York Filed Feb. 8, 1967, Ser. No. 614,719
Int. Cl. G11b *3/00;* H04m *1/60;* H04r *21/04*
U.S. Cl. 179—100.4 2 Claims

ABSTRACT OF THE DISCLOSURE

An input stage for a phonograph preamplifier having a transistor combined with a low impedance strain sensitive pickup.

The present invention relates to preamplifiers employed in phonographs and, more particularly, to the input stage of such a preamplifier.

For maximum power transfer, the input stage of a preamplifier should be driven by a pickup having approximately the same impedance as the input impedance of the stage. Transistor input stages normally have a low input impedance, and therefore, the pickup should have a low impedance. Conventional magnetic pickups have appropriately low impedances to efficiently drive transistor preamplifiers, but the power output from such pickups is quite low at lower frequencies. Ceramic and crystal pickups have higher outputs but their impedances are not appropriate for transistor preamplifiers.

Recently strain sensitive pickups, utilizing silicon semiconductor elements, have been developed which have sufficiently low impedances to be compatible with transistor preamplifier input stages. Previously the strain sensitive pickup has been coupled in series with a resistor and a constant D-C voltage source. As the force applied to the strain sensitive pickup is changed, its resistance changes, thereby changing the voltage drop across the series resistor and across the strain sensitive pickup. Either the voltage developed across the strain sensitive pickup or the voltage developed across the series resistor is coupled through a capacitor to the input stage of a preamplifier which, for example, may be a tarnsistor connected in a common emitter configuration.

In another type of circuit previously employed, the strain sensitive pickup has been coupled to a circuit providing a constant D.C. current. The voltage developed across the strain sensitive pickup is coupled through a capacitor to the input of the preamplifier. This constant current biased strain sensitive pickup provides double the output of the constant voltage biased strain sensitive pickup, when the same D.C. voltage is developed across the pickup.

It is an object of the present invention to provide an improved input stage for a phonograph preamplifier.

Another object is the provision of an input stage for a phonograph preamplifier which is inexpensive to manufacture and efficient in operation.

In accordance with one form of the present invention, an input stage of a phonograph preamplifier is provided which input stage includes a strain sensitive pickup and a transistor. The transistor is coupled so as to provide a D-C bias for the strain sensitive pickup while amplifying the signal produced by the pickup.

By further aspects of the present invention, additional desirable features may be included therein, and the specification concludes with claims particularly pointing out and distinctly claiming the subject matter which I regard as my invention. The invention, however, as to arrangement and mode of operation, together with further objects and advantages thereof, may best be understood by reference to the following description when taken in conjunction with the drawing.

The drawing shows a schematic circuit diagram of an input stage of a phonograph preamplifier, in accordance with one form of the present invention. The input stage illustrated in the drawing is for a phonograph preamplifier (not shown), and it includes a strain sensitive pickup 10 of low impedance, which may be the conventional silicon semiconductor type pickup. The pickup 10 is biased by connecting the same between the emitter 12 of a transistor 14 and ground 15. In the illustrated embodiment, transistor 14 is an NPN type transistor, but it will be understood by those skilled in the art that a properly biased PNP type transistor may also be advantageously utilized. The collector 16 of the transistor 14 is biased by connecting the same through a collector resistor 18 to the positive side of a D-C power supply (not shown), which preferably provides a constant output voltage.

The base 20 of the transistor 14 is biased positively with respect to the emitter by connecting the same through a base resistor 22 to the collector 16 of the transistor 14. A by-pass capacitor 24 is connected between the base 20 and ground so as to cause any A-C signal developed at the emitter 12 to be amplified in a common base manner.

The resistance of the pickup 10 changes as the force applied thereto changes, thereby causing a change in its current and consequently a change in the voltage developed between the collector 16 and ground. This voltage is supplied to subsequent stages of the phonograph preamplifier in the conventional manner.

The input stage of the preamplifier shown in the drawing provides a decreasing collector voltage as the resistance of the pickup is decreased. Normally, in stereo cartridges, two pickups are employed and they are mounted so that the signals produced by the pickups are out of phase. Since the pickups are merely resistive devices, this phase cannot be changed by reversing the terminals and, hence, a phase reversal circuit is necessary. It will therefore be understood by those skilled in the art that my invention may be effectively employed in conjunction with a phase reversal circuit.

In carrying out my invention, the following parameters or values were found to be particularly effective:

$e_s$ (open circuit voltage for a specific D-C voltage) = 75 mv.
$R_L$ (collector resistor 18) = 8200 ohms.
$R_B$ (base resistor 22) = 220,000 ohms
$R_S$ (pickup 10 resistance) = 500 ohms
V out (output voltage) = 300 mv.
C (base capacitor) = 2 microfarads.

For a cartridge having an internal resistance $R_S$, gage factor $G_F$, and an applied incremental force F, the open circuit voltage $e_s$ is proportional to the D-C voltage $V_R$ impressed across the strain sensitive element.

$$e_s = V_R G_F F$$

If it is assumed that $R_L$, $R_B$, and $R_S$ are of such magnitude as to obtain a stabilized D-C operating point for both the transistor 14 and the strain gage 10, for a given open circuit voltage $e_s$, $R_S$, $R_L$, and A-C bypass C, the output voltage is approximately:

$$V_{out} - \frac{e_s R_L}{R_S}$$

As the ratio of $R_L$ to $R_S$ increases, the output voltage $V_{out}$ will increase. The amount of the increase will be reduced, however, since this same change will reduce the D-C voltage across the strain gage. As a result, as the ratio of $R_L$ to $R_S$ increases, the output voltage $V_{out}$ will rise and level off at a voltage equal to that of the open circuit strain gage voltage $e_s$ biased with the full power supply voltage. This means the strain sensitive pickup is now being operated at a relatively low voltage and power level while the output of the total preamplifier system is equivalent to that of the strain gage biased at a relatively high voltage level.

It will now, therefore, be seen from the above that an input stage for a phonograph preamplifier is provided which achieves a D-C bias of the strain sensitive pickup while amplifying in a constant current manner the signal developed by the strain sensitive pickup. The input stage includes a minimum of components and therefore is inexpensive to manufacture.

While in accordance with the patent statutes, I have described what at present is considered to be the preferred embodiment of my invention, it will be obvious to those skilled in the art that various changes and modifications may be made therein without departing from this invention, and therefore, I aim in the following claims to cover all such equivalent variations as fall within the true spirit and scope of this invention.

What is claimed is:

1. In a phonograph preamplifier, an input stage comprising a low impedance strain sensitive phonograph pickup and a transistor of the NPN type, a first resistor connected between the collector of said transistor and a positive D-C voltage supply, a direct connection between one side of said pickup and the emitter of said transistor, the other side of said pickup being grounded, a second resistor connecting the base of said transistor to the collector of said transistor, and a capacitor bypassing the base of said transistor to the grounded side of said pickup, said transistor being coupled to said pickup so as to provide a D-C current for said pickup and to amplify the signal produced by changes in the resistance of said pickup, said pickup being connected to the emitter of said transistor so that the emitter current of the transistor flows through said pickup.

2. Apparatus in accordance with claim 1 wherein the output of the input stage is taken between the collector and ground.

References Cited

UNITED STATES PATENTS

| | | | |
|---|---|---|---|
| 3,170,043 | 2/1965 | Hohmann | 179—1 X |
| 3,144,522 | 8/1964 | Bernstein | 179—100.41 |
| 3,383,475 | 5/1968 | Wiggens | 179—110 |

OTHER REFERENCES

Euphonics Marketing Bulletin No. 369, pp. 7, 34, received in Patent Office, Aug. 13, 1965.

JAMES W. MOFFITT, Primary Examiner

R. F. CARDILLO, Jr., Assistant Examiner

U.S. Cl. X.R.

179—1